June 23, 1970 — J. CHERVENAK — 3,517,379
ELECTROMAGNETIC TRANSDUCER WITH A FIXED AIR GAP
Original Filed May 28, 1962
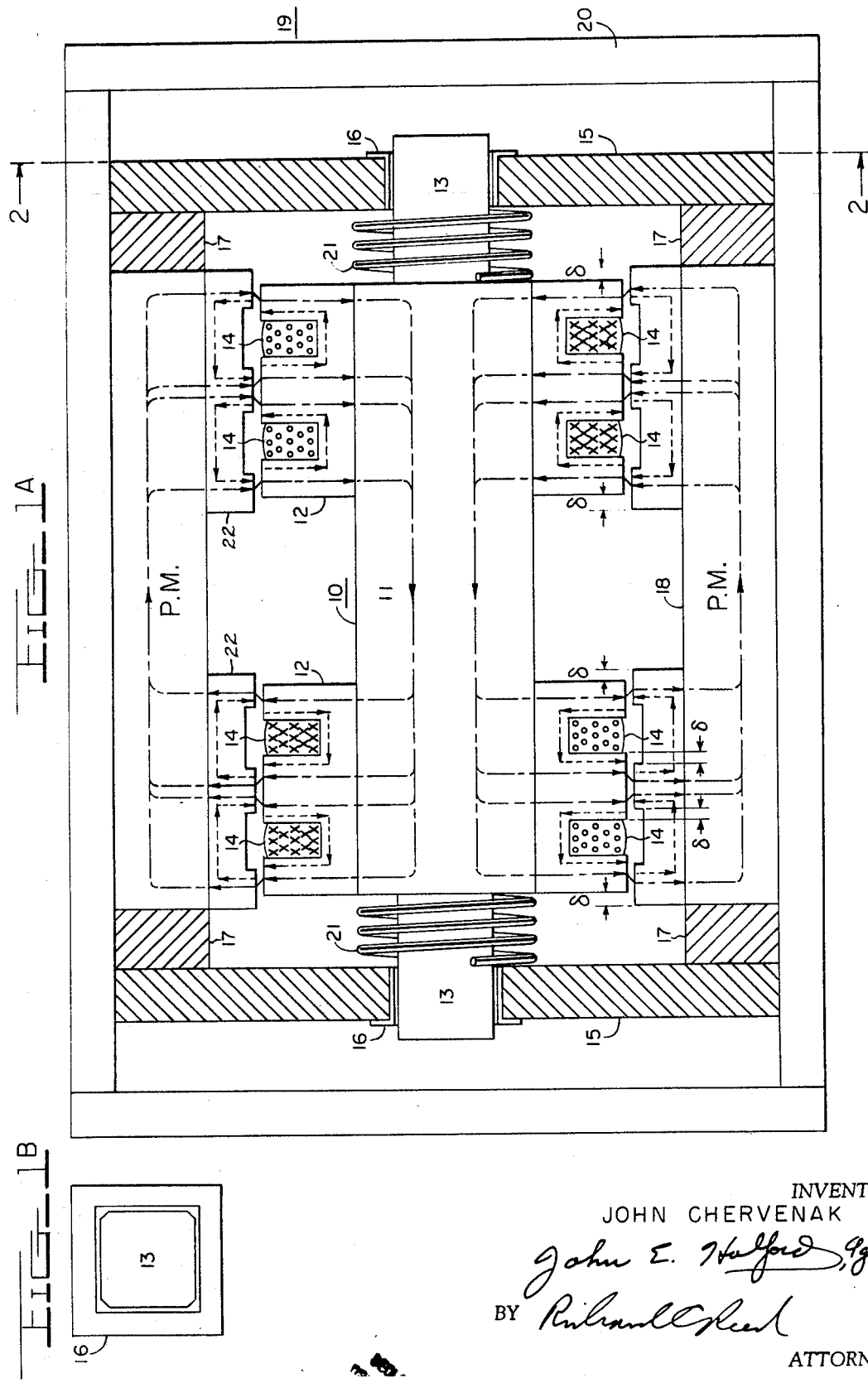
INVENTOR
JOHN CHERVENAK
ATTORNEY

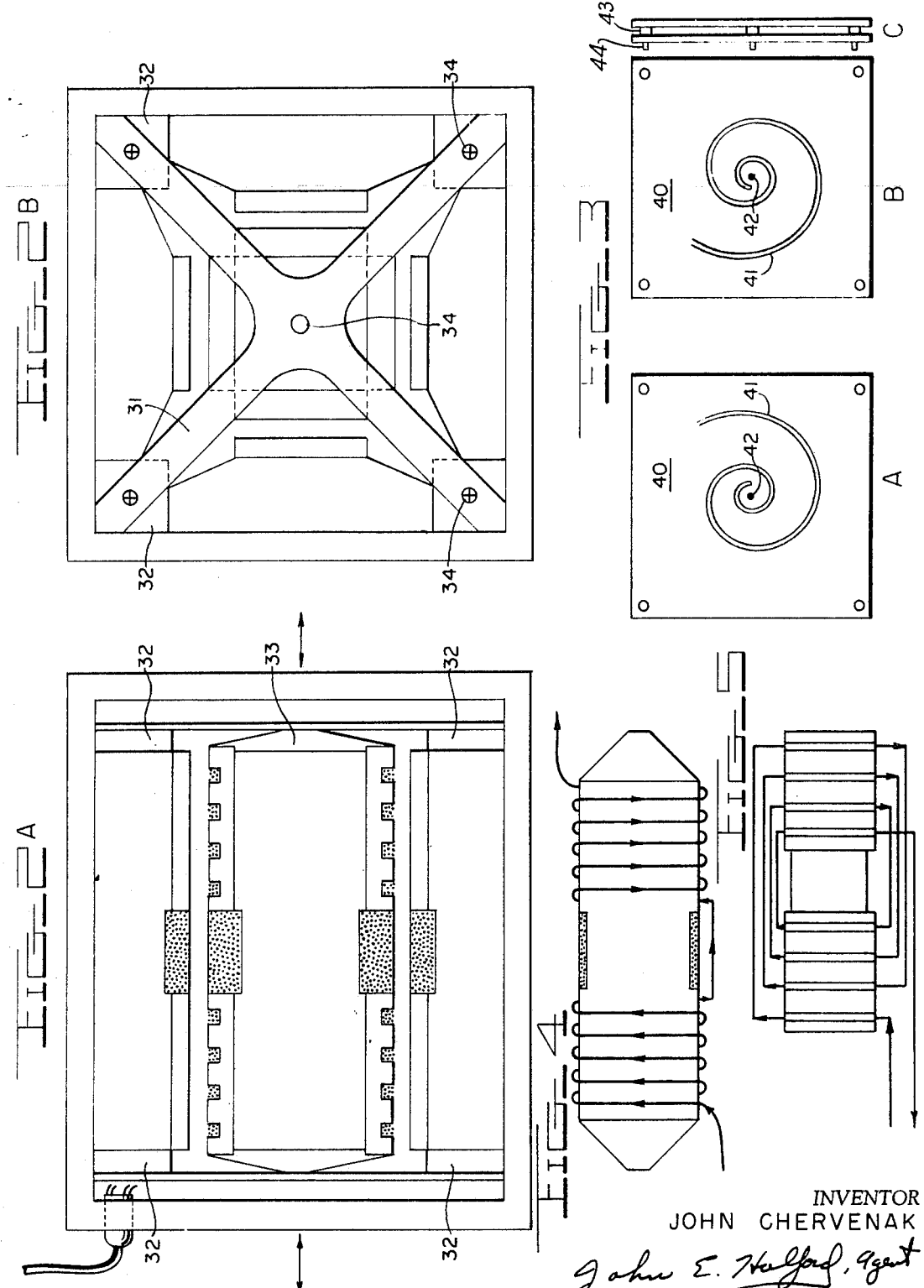

United States Patent Office 3,517,379
Patented June 23, 1970

3,517,379
ELECTROMAGNETIC TRANSDUCER WITH A FIXED AIR GAP
John Chervenak, Oxon Hill, Md., assignor to the United States of America as represented by the Secretary of the Navy
Continuation of application Ser. No. 199,227, May 28 1962. This application Mar 14, 1966, Ser. No. 535,651
Int. Cl. H04r 1/44
U.S. Cl. 340—12                                4 Claims The invention described herein may be manufactured and used by or for the Government of the United States of America for governmental purposes without the payment of any royalties thereon or therefor.

This application is a continuation of application Ser. No. 199,227, filed May 28, 1962, and now abandoned, for Electromagnetic Transducer With a Fixed Air Gap.

The present invention relates to transducers for converting electrical signals to underwater sound. More particularly, the invention relates to transducers of the type described above which operate at very low frequencies and high power levels.

Much work has been done in the development of transducers for converting electrical signals to sound waves in air. These transducers in general are not suitable for use in liquid media where the wave impedance is much higher. The problem is even greater at low frequencies where the small displacement of the transducer's radiating surface must be spread over a large area in order to produce sound wave of appreciable energy.

A very successful underwater sound source has been obtained by enclosing a transducer in a closed housing and using the entire housing as a radiating diaphragm. The housing is driven relative to a stator element by mounting a magnetic element on each and varying the magnetic coupling between the two elements. Nominal spacing between the elements is obtained by coupling springs, and these in turn determine the resonant frequency of the transducer. The magnetic coupling is of the variable reluctance form, so that a compromise air gap between the elements is chosen to provide the proper balance of coupling strength and displacement.

The above arrangement presents several rather serious problems in high power design. The air gap compromise represents a loss of available driving force and displacement. It would also be desirable to alter or eliminate the spring mounting arrangement for broadband application, but the limited displacement of the armature makes such changes impractical.

An object of the present invention is therefore to provide an efficient low frequency underwater sound transducer wherein the entire housing is oscillated through large displacements relative to an internal stator.

A further object of the invention is to provide a transducer of the type described above which operates over a broad band of frequencies.

These and other objects or attendant advantages of the present invention will be best understood with reference to the following specification, taken with the accompanying drawings wherein:

FIGS. 1A and 1B show one embodiment of a transducer according to the present invention having a bearing mounted stator;

FIGS. 2A and 2B show a second embodiment of the invention similar to FIG. 1 but having a flat spring for mounting the stator;

FIGS. 3A, 3B, and 3C show a further embodiment of the invention having a plurality of flat spiral springs for mounting the stator;

FIG. 4 shows a diagram of a winding structure suitable for use in the embodiments of FIGS. 1–3;

FIG. 5 shows a diagram of an alternate form of winding structure which can be used in the embodiments of FIGS. 1–3.

Referring more particularly to FIG. 1A, a transducer according to the present invention including stator bearings is disclosed. The stator 10, in this instance, consists chiefly of a permanent bar magnet 11 with a square cross section, although a round or other cross section might have been used. This magnet is permanently polarized along its length, as indicated by the dashed flux lines, and is fitted at each end with pole pieces 12 having high permeability but low magnetic remanence. The ends of the magnet are of reduced cross section to provide mounting shafts 13. Windings 14 are formed in recessed portions of the pole pieces.

The stator is enclosed within a housing 19 which is disclosed as a number of flat plates 20 welded, glued, or otherwise fastened together to form a box of generally cubical form. For a round stator, the box might be a hollow cylinder with disc-shaped ends, but the cubical form is now preferred because it packs nicely into large arrays. The armature is made smaller than the internal dimensions of the housing so that it will not touch the housing when vibrating at a preselected maximum amplitude.

To position the stator a separate support member 15 is attached to the housing and one shaft of the stator at each end thereof. For example, the support member may be a solid wall filling the entire cross section of the housing, except for an aperture to pass the stator shaft. This aperture may be fitted with a bearing 16, if desired, to reduce friction and/or to provide a means for compensating wear at this point. Corner reinforcing blocks 17 may be used to strengthen the bond between the support member and the housing.

FIG. 1B shows an end view of the bearing and shaft viewed along the section line 2—2 in FIG. 1. Due to the cubical structure involved in this embodiment, relative rotation between the stator and housing, about the stator axis, cannot be tolerated. The shaft and bearing are, therefore, of square cross section or otherwise keyed together to permit free longitudinal movement along the stator axis. In cylindrical embodiments such keying is not necessarily required.

To complete the transducer one or more permanent armature magnets 18 with pole pieces 22, similar to those on the stator, are attached to the housing. These are arranged to form a closed magnetic circuit with corresponding pole pieces 12 on the stator and with an air gap between the opposed pole pieces. If the restoring forces in the magnet circuit, which tend to center the stator in the housing, are not sufficient; springs 21 may be inserted between the stator and housing on each stator shaft.

The pole pieces are designed to supply driving forces when A.C. current is applied to the windings. The winding recesses divide the stator pole pieces 12 into a plurality of projections. A similar plurality of projections is provided on the armature pole pieces 22, with the end projections thereon displaced from center an amount $\delta$ (see drawing) further than those on the stator pole pieces 12, but still providing at least half of the end projections, 12 and 22 respectively, on the opposed stator and armature pole pieces, 10 and 18 respectively, in overlapping relationship. The opposing faces provided by the armature pole pieces 22 are all equal to one another and to those of the end projections of the stator pole pieces 12. The intermediate projections of the stator pole pieces 12 are broadened so that their opposing faces are $2\delta$ wider than those of the armature pole pieces 22.

The operation of the transducer is easily understood by referring to the flux lines in FIG. 1A. The dashed lines represent the steady flux supplied by the permanent magnets. The dotted lines represent instantaneous flux produced by A.C. current flow in windings 14. Note that the fluxes in the left end projections add while those in the right end projections cancel. In the intermediate projections the fluxes in the right half add while those in the left half cancel. In order to bring the opposing faces with maximum flux into registry, the armature including the housing tends to move to the right. When the current flow through windings 14 reverses direction, the instantaneous flux produced thereby reverses and the armature moves to the left.

The value of $\delta$ determines the maximum relative displacement of the armature to the stator. As can be seen rather large values of $\delta$ are easily obtainable. This is the chief distinction over the earlier discussed variable reluctance transducers where the maximum displacement was limited to a few mils. With the present transducer ten or more times this displacement is easily attained with air gaps of only a fraction of a mil. The projections on the pole pieces are made large enough to provide an overlap greater than $\delta$. The starting load with which the transducer can operate satisfactorily is a direct function of this overlap.

The size of the transducer as a whole depends on the sound power desired and the operating frequency. Obviously larger units will produce more power. However, to be useful in beam forming arrays the dimensions of the housing must be less than a half wavelength.

The mass of the transducer is concentrated mainly in the stator and armature magnets and their pole pieces. This provides a maximum of coupling flux per unit weight of the overall structure. The housing and support members on the other hand are preferably made from a strong lightweight material, which of course, must be nonmagnetic as not to shunt the flux paths. A unity mass ratio of the armature and stator, i.e., all parts which move together as a unit in each instance, has been found to give very satisfactory performance.

Suitable materials for the various parts of the transducers will be immediately apparent to those skilled in the art. The permanent magnets may be formed, for example, of "Alnico V," an alloy composed by weight of 8% Al, 14% Ni, 24% Co, 3% Cu, the balance being iron. The pole pieces may be fabricated from grain oriented transformer steel. This is a low carbon steel (approximately 0.01%) with about 3% silicon. The housing, support members, reinforcing blocks and the like may be aluminum.

The remaining parts are also readily fabricated from commercially available materials. The springs may be formed from any of the numerous steel spring metals on the market. The windings can be formed from 18 gauge magnet wire covered with "Formvar," an acetal type of synthetic resin made from Gelva (q.v.) and formaldehyde. The bearing material is sold under the name "Oilite" and consists of porous metal impregnated with oil.

The various parts of the armature and stator may be bonded together with epoxy resin cement. Although a good bond for the bearing may be obtained by properly cleaning its surface, fasteners such as rivets or the like should also be used. The cement may also be used as an encapsulating medium to fill in the spaces between the parts and provide a smooth continuous surface over the entire unit.

Encapsulation is particularly important when the interior of the housing is free flooded or filled with oil. The parts are thus protected from chemical action with the fluid and the smooth surface causes less turbulence as the stator passes through the fluid. The ends of the stator may be tapered to further reduce turbulence. The fluid absorbs the strain on the walls due to ambient pressure at the great depths in the water medium for which the transducer is designed. Free flooded models include an open port (not shown) in the housing wall.

The ends of the windings are brought out of the housing and connected to an A.C. signal source (not shown). At the point where the ends of the windings pass through the housing wall a conventional rubber or plastic seal may be employed. In free flooded models the open port may be used without such a seal. If desired, the armature and stator pole pieces may be interchanged, so that the windings are attached only to the housing.

FIGS. 2A and 2B show an alternate embodiment of the transducer without bearings. The stator is supported within the housing by means of an X-shaped flat sheet steel spring 31. The ends of the stator magnet are provided with stapered end pieces 33 and the ends of the armature magnets with mounting blocks 32 to which the spring is attached. These are made from a non-magnetic material such as aluminum to prevent a shunt flux path through the spring. Alternately the spring may be nonmagnetic or connected to ends of the housing rather than the armature magnet. Again epoxy resin cement is used, although the spring may be fastened solely with screws 34, if disassembly is contemplated.

FIG. 3 shows a different form of the spring in FIGS. 2A and 2B. The spring is made from flat sheets 40, as shown in FIG. 3A into which is cut a spiral slot 41. When the sheet is inverted the spiral is reversed, as shown in FIG. 3B. The ends of the stator are attached near the center 42 of the spiral. Since the spring structure is asymmetrical the end of the stator may tend to be pulled from its axial position. Using two relatively inverted springs as shown in FIGS. 3A and 3B at each end of the stator will tend to correct this. The springs are separated by spacing washers 43 as shown in FIG. 3C which are placed on the mounting screws 44. Any number of springs may be added in this manner to provide additional stiffness. Still further compensation may be provided by adding a second pair at each end like the pair shown in FIGS. 3C but rotated 180° about the stator axis.

FIGS. 4 and 5 show schematic diagrams for winding the coils of the transducer. As shown in FIG. 4 the coils at one end may be wound around the stator axis in one sense and at the other end in the opposite sense. This is probably the best method when the windings are formed directly on the stator. FIG. 5 shows the diagram of a removable winding which may be inserted into the recesses of the pole pieces after it is formed. This method would probably be preferred for mass production and for models which can be disassembled for repair.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A fixed air-gap electromagnetic transducer comprising:
   a hollow housing having end and side walls;
   flexible support means interconnecting said side walls;
   first magnet means, including a permanent magnet and at least one first pole piece, attached to said housing;
   second magnet means, including a permanent magnet and at least one second pole piece, mounted in said flexible support means, said flexible support means permitting relative movement of said first and second magnet means only in a single linear path;
   said first and second pole pieces having respective surfaces which are substantially parallel to said path and which are separated by said fixed air-gap;
   said surfaces of each of said second pole pieces having recessed portions;
   windings disposed in each of said recessed portions;
   said permanent magnets and first and second pole pieces being so located that current in said windings causes relative movement of said first and second magnet means.

2. The electromagnetic transducer set forth in claim 1 wherein said flexible support means comprises:
at least one metal plate attached to said side walls and having a bearing lined aperture in which said second magnet means is mounted and
spring means interposed between each of said metal plates and said second magnet means for centering said second magnet means relative to said first magnet means.

3. The electromagnetic transducer set forth in claim 1 wherein:
each of said first pole pieces are wider by an amount $2\delta$ than each of said second pole pieces, where $\delta$ is an arbitrarily chosen design dimension which is substantially determinative of the maximum relative movement of said first and second magnet means;
each of said first and second pole pieces having end and intermediate projections, the projections of said first pole pieces being separated from the projections of said second pole pieces by said air gap;
all of the projections on said first pole pieces being of equal width and the intermediate projection of said second pole pieces being wider by an amount $2\delta$ than the projections on said first pole pieces.

4. The electromagnetic transducer set forth in claim 3 wherein said flexible support means comprises:
at least one metal plate attached to said side walls and having a bearing lined aperture in which said second magnet means is mounted and
spring means interposed between each of said metal plates and said second magnet means for centering said second magnet means relative to said first magnet means.

References Cited
UNITED STATES PATENTS 3,018,467  1/1962  Harris _____ 340—12

RICHARD A. FARLEY, Primary Examiner

J. G. BAXTER, Assistant Examiner